Feb. 21, 1939.  L. E. LA BRIE  2,148,240
BRAKE
Filed Nov. 20, 1935    5 Sheets-Sheet 1

INVENTOR.
LUDGER E. LA BRIE.
BY Jerome R. Cox
ATTORNEY.

Feb. 21, 1939.　　　　L. E. LA BRIE　　　　2,148,240
BRAKE
Filed Nov. 20, 1935　　　　5 Sheets-Sheet 2
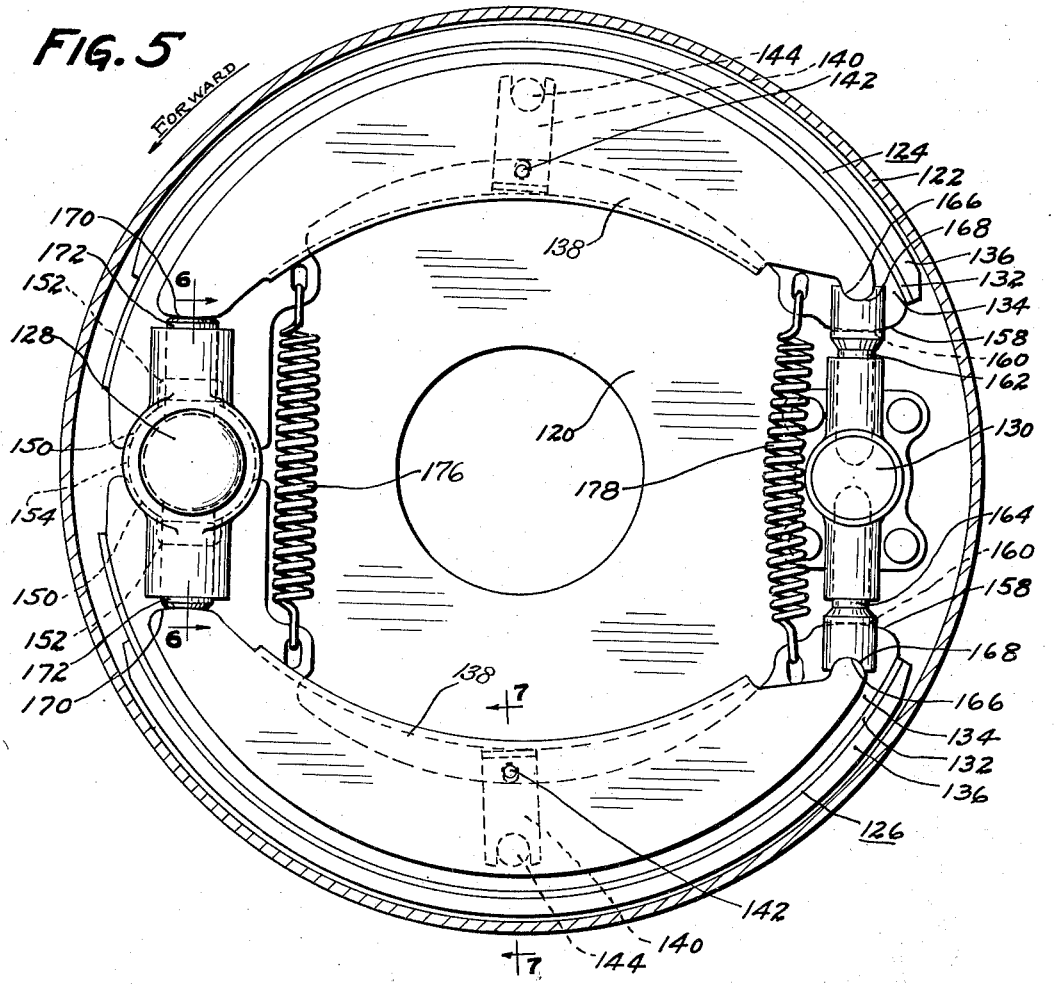
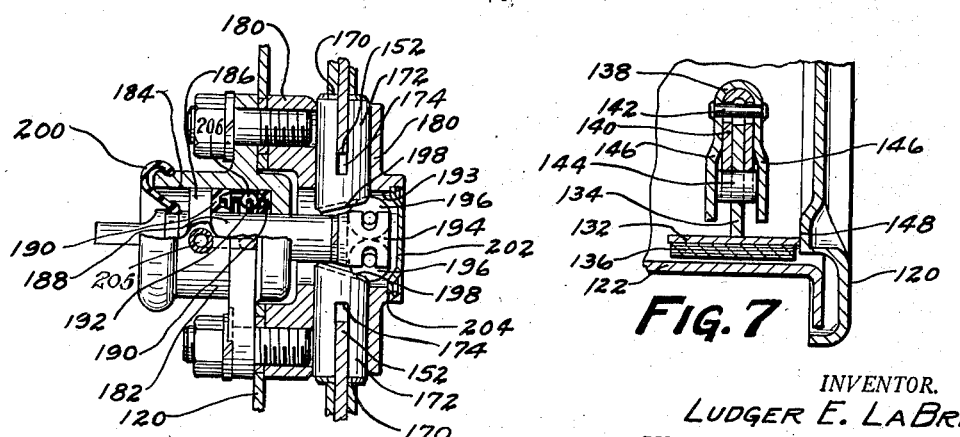
INVENTOR.
LUDGER E. LA BRIE.
BY Jerome R. Cox
ATTORNEY.

Feb. 21, 1939.  L. E. LA BRIE  2,148,240
BRAKE
Filed Nov. 20, 1935   5 Sheets-Sheet 3
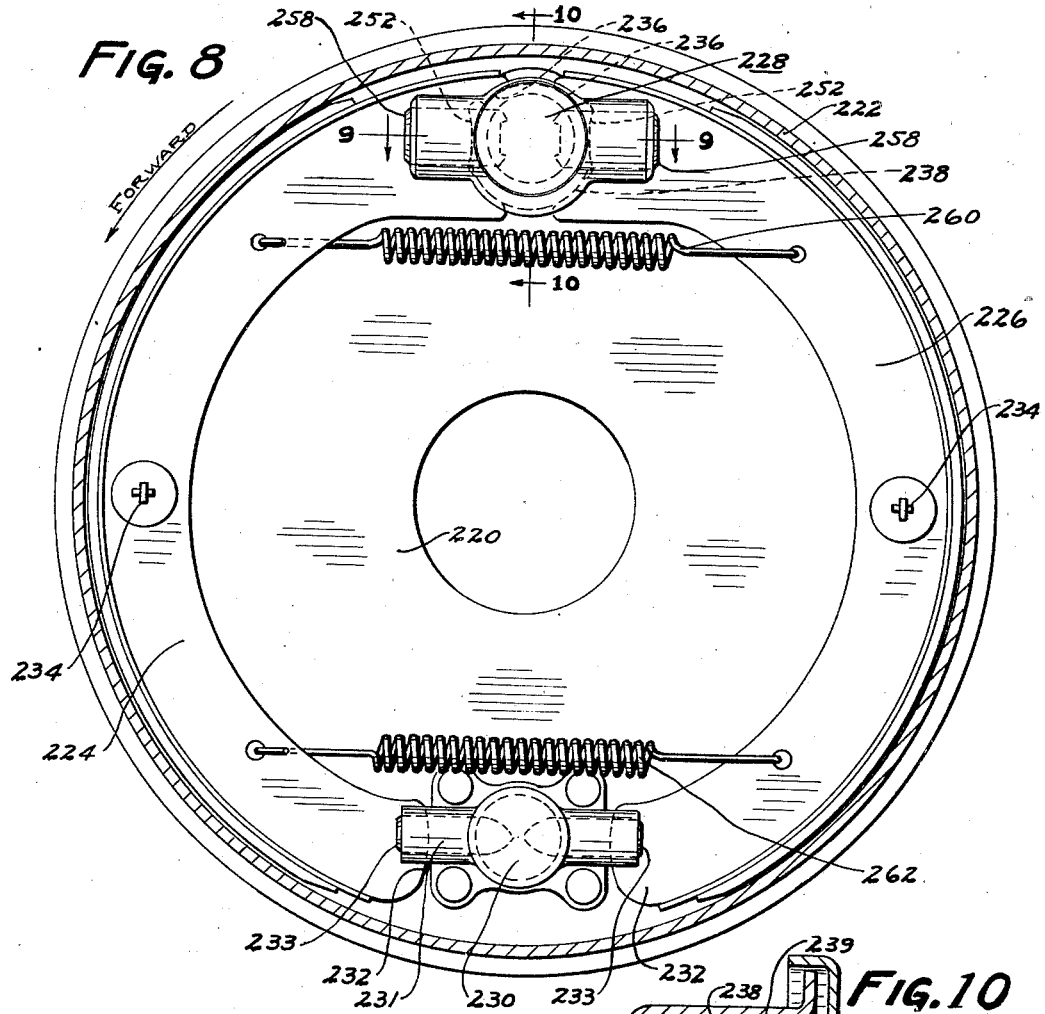
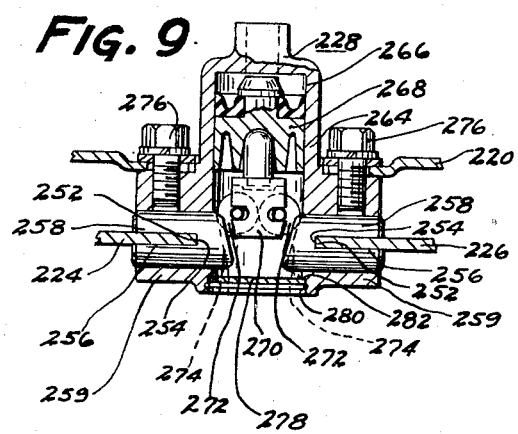
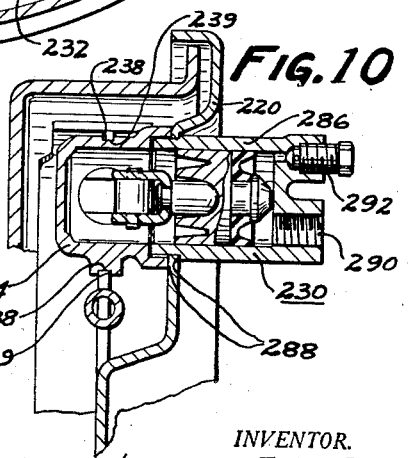
INVENTOR.
LUDGER E. LaBRIE.
BY Jerome R. Cox
ATTORNEY.

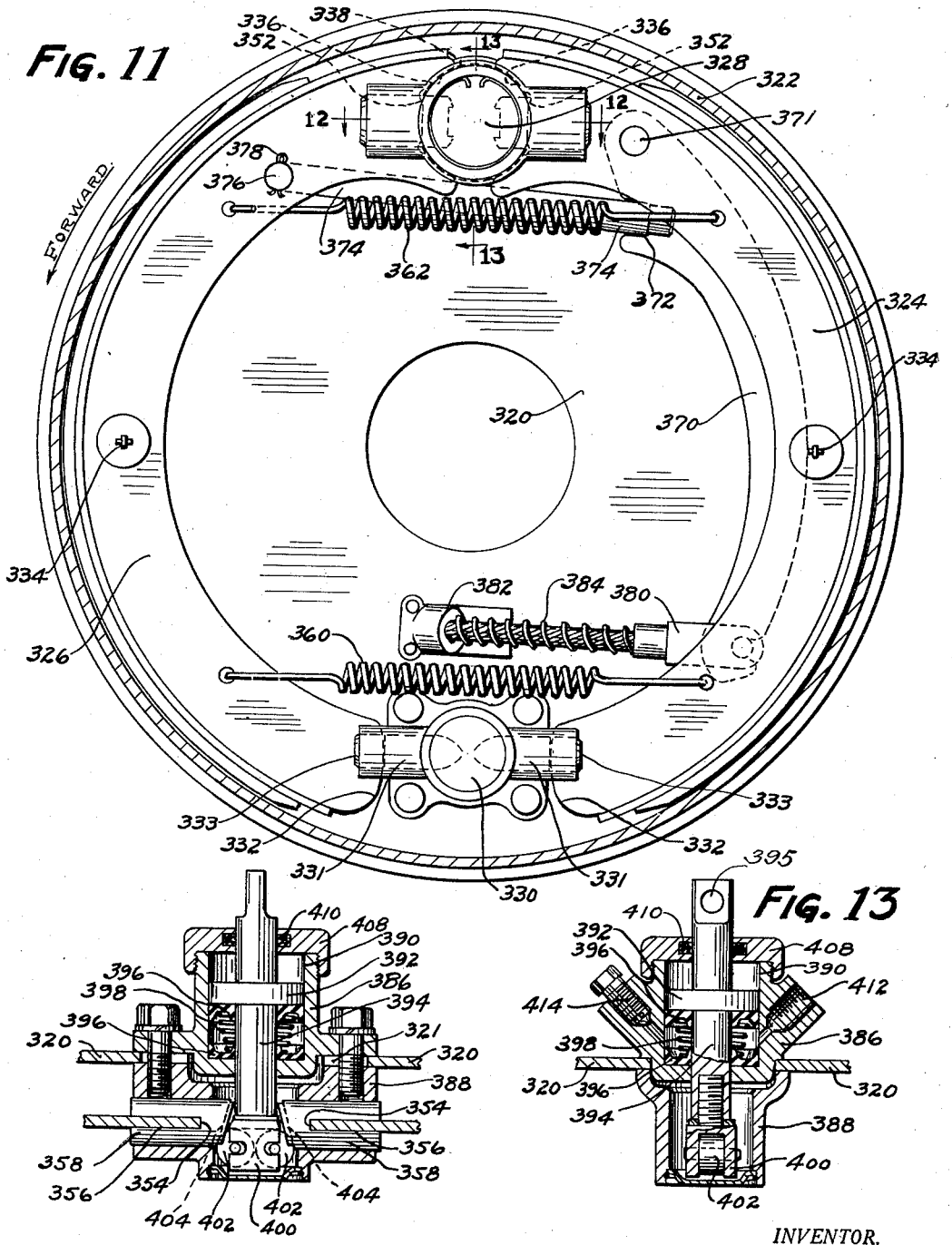

Feb. 21, 1939.  L. E. LA BRIE  2,148,240
BRAKE
Filed Nov. 20, 1935  5 Sheets-Sheet 5

INVENTOR.
LUDGER E. LaBRIE.
BY Jerome R. Cox
ATTORNEY.

Patented Feb. 21, 1939

2,148,240

UNITED STATES PATENT OFFICE 2,148,240

BRAKE

Ludger E. La Brie, Detroit, Mich., assignor to Bendix Products Corporation, South Bend, Ind., a corporation of Indiana Application November 20, 1935, Serial No. 50,744

16 Claims. (Cl. 188—152)

This invention relates to automotive vehicle brakes and more particularly to hydraulic brakes wherein a single hydraulic cylinder and piston paraxially arranged is employed to actuate the brake.

The invention is directed toward various modifications and embodiments of a hydraulic cylinder arranged perpendicular to a brake backing plate as suggested, in combination particularly with internal expanding brakes, the combination including a mechanism for transmitting the hydraulic force derived from the brake shoes efficiently with a minimum of friction and without complicated structures, which might otherwise require complicated forms of adjustment.

Accordingly an object of the invention is to provide in a hydraulic brake, an efficient combination of brake and operating cylinder, the latter being arranged parallel to the brake axis.

Another object of the invention is to provide an improved single cylinder and piston hydraulic brake operator for an automotive vehicle brake.

A further object of the invention is to provide various efficient, compact and simple cylinder constructions peculiarly adapted for use in conjunction with brakes of the type herein referred to.

Still another object of the invention is to provide hydraulic brake structures employing but a single wear adjustment.

The above objects and others, together with many other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Fig. 5 is a front elevation of a modified form of brake having the same general arrangement and simplicity, the same being shown from a plane passed through the brake drum back of the drum head;

Fig. 6 is a section through the cylinder and actuating means of Fig. 5 taken on line 6—6;

Fig. 7 is a section through a brake shoe of Fig. 5 showing the auxiliary lever and taken on the line 7—7;

Fig. 8 is a front elevation of a further modified form of the invention, the brake drum having the head cut away;

Fig. 9 is a section through the cylinder and actuating means of Fig. 8 taken on line 8—8;

Fig. 10 is a section through the cylinder of Fig. 8 taken on the line 10—10;

Fig. 11 is a front elevation of a further modified form of the invention also including a form of mechanical actuation therefore, the brake drum head being cut away for clear vision;

Fig. 12 is a section taken on the line 12—12 of Fig. 11 showing the modified cylinder and shoe actuating linkage in section;

Fig. 13 is a section taken on the line 13—13 of Fig. 11 illustrating the cylinder and its hydraulic connections;

Figure 1:
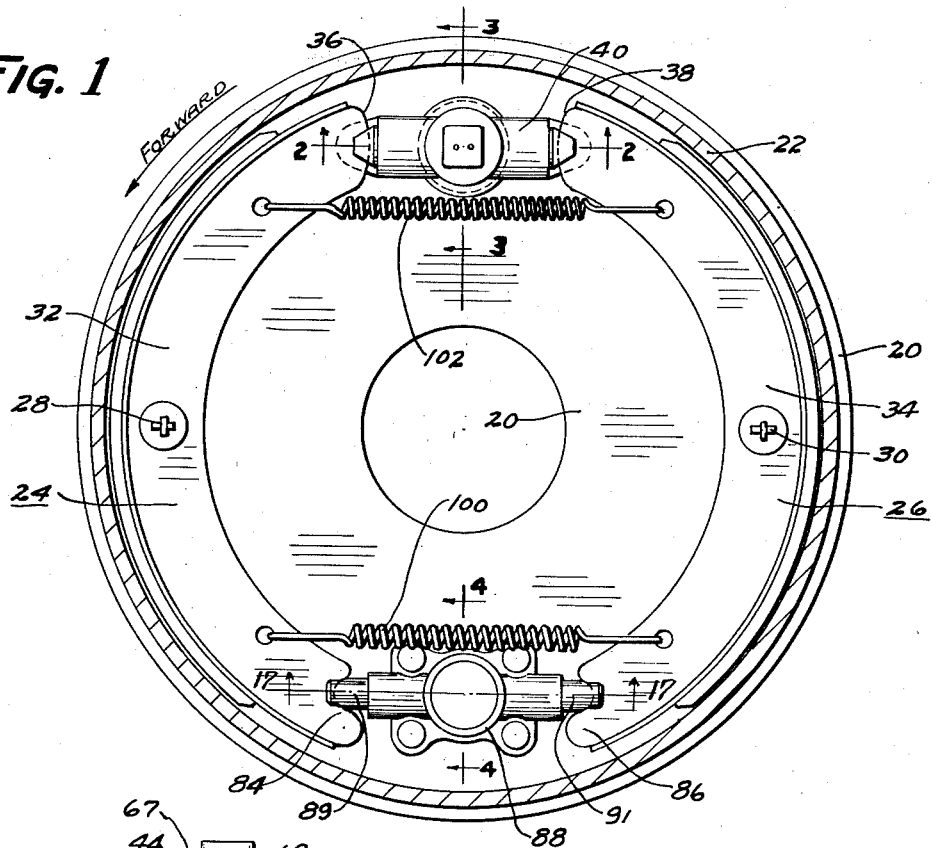
Fig. 1 is a front elevation of the brake with the drum shown in section just inside the drum head.
Figure 2:
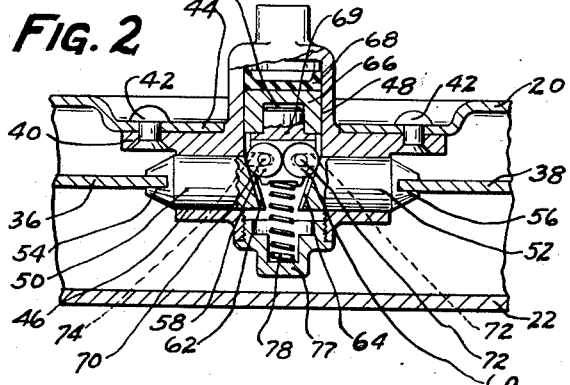
Fig. 2 is a section through the cylinder and actuating means of Fig. 1 taken on the line 2—2.
Figure 3:
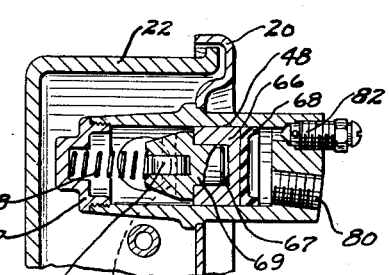
Fig. 3 is a section through the cylinder of Fig. 1 taken on the line 3—3.

Referring to the drawings and more particularly the modification of Figs. 1-4, inclusive, there will be seen the usual brake drum backing plate 20 usually secured to a part stationary with respect to the adjacent wheel or rotating shaft, a brake drum 22 adapted to rotate with the adjacent wheel or shaft and a pair of brake shoes 24 and 26, the latter frictionally held against the backing plate by coil springs 28 and 30 tensioned between the shoe webs 32 and 34 and the backing plate immediately therebehind.

Between the spaced ends 36 and 38 of the shoes 24 and 26 is located a casing 40 secured to the backing plate by suitable means such as rivets 42 and mounted upon a struck up corresponding portion 44 in the backing plate. The casing is provided with a bore 46 arranged tangentially or along a chord between the ends 36 and 38 of the brake shoes, and a bore 48 at right angles thereto and parallel with the brake drum rotational axis. The tangential or chordal bore is provided with a pair of plungers 50 and 52 notched in their outer ends as at 54 and 56 to receive the rounded ends 36 and 38 of the brake shoe webs. Their inner ends are inclined and provided with an inclined groove lying in a plane passing through the axis of the bores 46 and 48 and are adapted to receive a pair of rollers 58 and 60, each of which rolls against each other and in their respective inclined grooves 62 and 64 in the plunger ends.

The bore 48 is provided with a hydraulic piston 66 having on its face a cup washer 68, and on its reverse side, a recess 67 into which is set a carrier 69 for the short stub axles 70 and 72 of the rollers 58 and 60, the stub axles being carried in slots 74 and 76 in a bifurcated portion of the carrier 69. The end of the bore 48 within the brake chamber is provided with a screw cap 77, and between the cap and the carrier 69 is a compression spring 78 adapted to return the piston and release the brake. The other end of the bore 48 is provided with a suitable connection 80 for a hydraulic line, and a bleed port 82.

Adjustment of the brake is accomplished by an adjustment located between the other adjacent shoe ends 84 and 86. A casing 88 secured to the backing plate and having a tangential or chordal bore 87 therethrough is provided with a pair of plungers 89 and 91 notched at their outer ends to receive the shoe ends 84 and 86, and notched at their inner ends to engage an adjusting cone 90 having elemental grooves 92 therein. The cone also has a threaded shank 94 with a key fitting 96 on the end thereof, the shank being received in a threaded bushing 98 arranged parallel to the brake axis and forming a part of the casing 88. Springs 100 and 102 maintain the brake shoes in engagement with the actuating and adjusting plungers.

Figure 4:
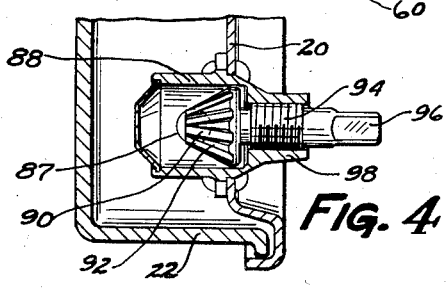
Fig. 4 is a section through the adjusting wedge of Fig. 1, taken on line 4—4.

A modified form of the invention is shown in Figs. 5–7 wherein the brake backing plate is indicated at 120, a brake drum at 122, brake shoe assemblies 124 and 126, brake operating cylinder 128, and adjustment 130, the latter being similar to that shown in Fig. 1 and described in detail in connection with Fig. 4. In order to provide a two-shoe brake in which both shoes act in a self energizing manner regardless of rotation direction, each brake shoe assembly 124 and 126 comprises a rigid shoe having a rim 132, web 134 and a lining 136, and an arcuate channel sectioned lever 138 embracing the shoe web, the latter provided centrally and within the channel, with a U-shaped clip 140 pivotally secured by a pin 142 to the lever 138, and provided with notched ends adapted to embrace either end of a pin 144 passing through an aperture provided in the brake shoe web 134. The sides of the lever 138 are flared slightly as at 146 to accommodate a pin slightly longer than that required by the thicknesses of the notched clip ends and brake shoe ends, so as to provide a margin of safety.

The brake shoes and assemblies are supported by the adjustment 130 and the cylinder 128 and are positioned to slide upon struck-up portions 148 in the backing plate. The webs of each of the brake shoes are provided in the ends adjacent the cylinder with a circular notch 150 and cut-away portion 152, the circular notch being adapted to engage an annular groove 154 in the cylinder casing to form an anchorage. The other ends of the shoe webs have a slightly rounded end 158 and engage in axial-extending slots 160 formed in the end of the adjuster plungers 162 and 164. Thus an anchorage is provided for either end of each shoe. The arcuate channel levers 138 which embrace the brake shoes are provided at one end with a rounded tip 166 adapted to engage in a complementary recess 168 in the end of the slotted adjuster plungers 162 and 164. The other end of the lever 138 is rounded slightly at 170 and adapted to engage plungers 172 which plungers are also axially slotted as at 174 to receive the anchoring ends 150 of the brake shoes. A pair of springs 176 and 178 are tensioned between the adjacent shoe ends and retain the shoe assemblies in tight engagement with the supporting parts.

The hydraulic operating cylinder assembly comprises a plunger housing member 180 having bores for the plungers 172, and a cylinder member 182, the two members being clamped together on opposite sides of the backing plate 120. The cylinder member is provided with a cylinder bore 184 arranged at right angles to the backing plate, and is fitted with a piston 186 having a piston rod 188 extending through the head of the cylinder. A pair of annular cup washers 190 are arranged around the piston rod between the piston and cylinder head, and are retained in place by a small coil spring 192. The end of the piston rod 188 extends into a coaxial bore 193 in the plunger member 180 and carries a roller housing 194, the same being bifurcated and containing abutting rollers 196 which engage inclined grooved ends 198 of the plungers 172, in similar fashion to that of Figs. 1–4.

The end of the cylinder is enclosed by a flexible dust cap 200 engaging annular grooves in the piston rod and cylinder, and the bore 193 in the plunger member is provided with a disc cap 202 snapped in position against an annular internal shoulder 204. A brake operating fluid connection 205 is made to the cylinder at a point between the cup washers and a bleed port 206.

A further form of the invention is shown in Fig. 8, the details of the actuating cylinder and mechanism being illustrated in Figs. 9 and 10. The brake as shown comprises a backing plate 220, brake drum 222, brake shoes 224 and 226, adjustment 230 and operating cylinder and mechanism 228. The brake shoe webs at their anchor-engaging ends are provided with rounded portions 232 which extend into slots both in the housing 231 and plungers 233. The shoes are held against the backing plate by hold-down springs 234 tensioned between the shoe webs and backing plate.

The shoe webs at their actuating ends are provided with a circular notch 236 adapted to engage an annular groove 238 on the outside of the operating cylinder 228. The circular form of the notch is interrupted centrally by a cut-away portion 252, providing a slightly outwardly curved edge adapted to engage the bottom 254 of a slot 256 in the operating plungers 258 of the operating mechanism. The brake shoes are held in place against the operating cylinder and adjuster by springs 260 and 262 and the circular notch 236 centers the shoes when in release position.

Referring to Fig. 9 wherein the cylinder is illustrated more in detail and also Fig. 10 wherein a cylinder of two-part construction is shown but with the same operating means, a housing or casing member 264 is shown having a cylinder bore 266, in which operates a piston 268 carrying a bifurcated roller carriage 270 having rollers 272 engaging the inclined grooved ends 274 of the plungers 258. The plungers 258 are slotted as heretofore described, and the housing in which the slide is provided with an annular groove 238 lying in the plane of the axes of the plungers, the annular groove cutting deep into the plunger bosses 259 but forming only a shallow groove such as 239 in Fig. 10 in the exterior wall of the casing at other points. In Fig. 9, the casing 264 is one piece and secured to the backing plate in an aperture provided therefor by bolts 276, and the casing bore 266 is closed by a diaphragm 278 held in place by a ring spring 280 and an annular shoulder 282 on the inside of the bore 266. In Fig. 10 the housing is illustrated as comprising two parts, a cup-shaped plunger part 284 and a cylinder part 286, the two being screwed together in an aperture in the backing plate in such a manner as to clamp the backing plate between shoulders 288 formed on or by the parts. A suitable fluid connection 290 and bleed port 192 are shown in Fig. 10.

In Fig. 11 is illustrated a further modified form of the invention, the brake structure being similar to that of Fig. 8 but with a modified actuating cylinder and a mechanical actuating linkage in addition to the fluid pressure actuation. The brake, as shown, comprises a backing plate 320, brake drum 322, brake shoes 324 and 326, adjustment 330 and operating cylinder and mechanism 328. The brake shoe webs at their anchor-engaging ends are provided with rounded portions 332 which extend into slots both in the housing 331 and plungers 333. The shoes are held against the backing plate by hold-down springs 334 tensioned between the shoe webs and backing plate.

The shoe webs at their actuating ends are provided with a circular notch 336 adapted to engage an annular groove 338 on the outside of the operating cylinder 328. As in Fig. 8, the circular form of the notch is interrupted centrally by a cut-away portion 352 providing a slightly outwardly curved edge adapted to engage the bottom 354 of a slot 356 in the actuating plungers 358 of the operating mechanism. Springs 360 and 362 hold the shoes against the operating cylinder and adjuster, and the circular notch 336 centers the shoes when in release position.

To provide for mechanical actuation an arcuate lever 370 lying behind the web of one shoe is pivoted at one end 371 to the upper end of the shoe. The lever is notched at 372 a short distance from the pivot to slidably receive a split end of a strut 374 which extends across the brake and has at its other end a short section 376 bent at right angles which is pivotally received in a hole in the other brake shoe, and retained therein by a cotter pin 378. The free end of the lever has secured thereto a clevis 380 fastened to the end of a flexible cable which extends through a hole in the backing plate, the hole being provided with a fitting 382 to which may be secured a flexible conduit. A spring 384 may be threaded on the cable between the fitting 382 and clevis 380 to urge the lever to release position.

The operating cylinder and mechanism of Figs. 12 and 13 comprises a cylinder member 386 and a plunger casing 388 bolted together on opposite sides of the backing plate 320 in an aperture 321 provided therefor. As in Fig. 6, the cylinder bore 390 is provided with a piston 392 and rod 394 with spaced annular cup washers 396 on the rod and retained in place against the cylinder head and piston by a light spring 398. On the end of the piston rod is a roller carrier 400 with rollers 402 engaging inclined grooved ends 404 of plungers 358. The cylinder is provided with a cap 408 through which the free end of the piston rod may extend for mechanical operation, there being provided a felt washer 410 around the rod to prevent entrance of foreign matter. Fluid pressure may be admitted to the cylinder through a connection 412 leading into the cylinder between the cup washers 396, and a bleed port 414 may be provided as shown.

It is to be understood that the felt washer 410 does not form a fluid seal and allows the ingress and egress of air as the piston is moved. However, it does prevent the entrance of dirt and other foreign matter which might otherwise fall in the cylinder. The rod 394 is provided with a hole by which the actuator may be mechanically actuated.

Figure 14:
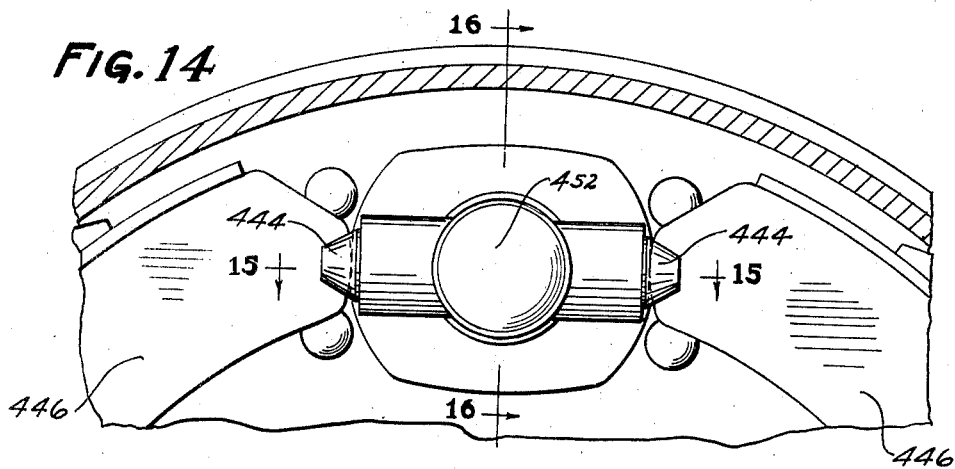
Fig. 14 is a portion of an end elevation with the drum head cut away of a modified anchoring arrangement forming one part of the invention.
Figure 15:
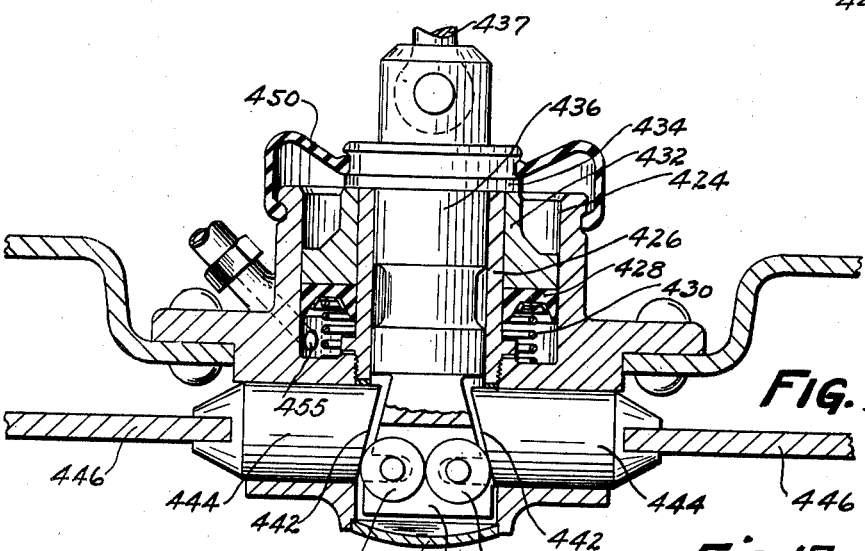
Fig. 15 is a section through Fig. 14 taken on the line 15—15.
Figures 16, 17:
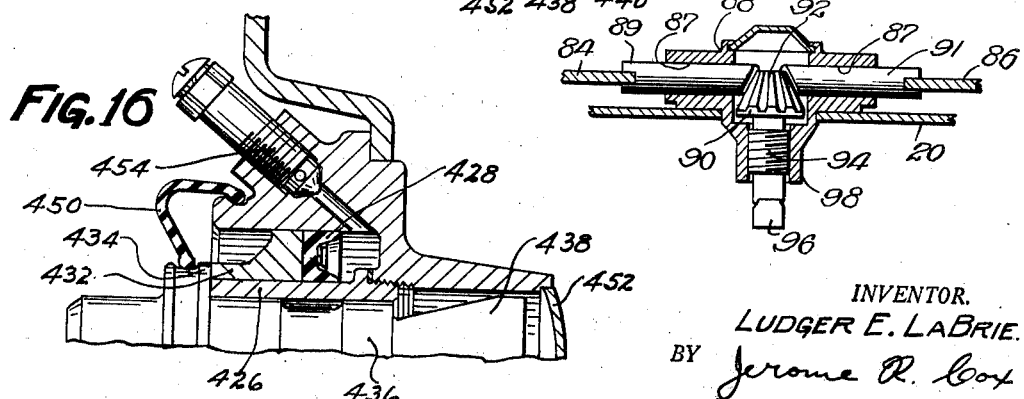
Fig. 16 is a section through Fig. 14 taken on the line 16—16.
Figure 17 is a view in section taken substantially on line 17—17 of Figure 1.

A modified form of the invention showing a cylinder especially adapted for mechanical operation of the piston is illustrated in Figs. 14, 15 and 16. The cylinder casing is provided with a cylinder bore 424, and a central sleeve 426 providing an annular cylinder space therebetween. An annular piston fitted between the sleeve and bore is provided with an annular cup washer 428 held in place against the piston by a light spring 430. The piston is provided with a sleeve 432 extending along the cylinder sleeve and is adapted to engage a shoulder 434 on a central axially movable operating member 436 extending through the cylinder sleeve. One end of the operating member may be mechanically operated as by a link 437 and the other end is provided with a roller carriage 438 and rollers 440 operating on inclined ends 442 of plungers 444, which have slotted ends embracing the ends of brake shoes 446. An annular flexible boot 450 protects the cylinder from foreign matter and a Welsh plug 452 may be employed to close the aperture in the other side of the casing adjacent the rollers. A bleed port 454 and a fluid pressure connection 455 are provided.

The operation of the various forms of the invention will readily appear from the foregoing description. In Fig. 1 the brake shoes 24 and 26 are, when in release position, centered by their special engagement with the plungers 89 of the adjuster, which also forms the anchorage. Entrance of fluid pressure into the cylinder 48 forces the piston 66 to move the rollers along the inclined grooves 62 of the actuating plunger 50 thus applying the brake. With the brake applied the brake shoes 24 and 26 may be adjusted for wear by operation of the grooved cone adjuster 90. By rotating the shaft 96, the threads 94 force the cone axially of the drum, the grooves and ridges forcing the plungers outward until the cone can be turned no more after which the plungers seat themselves in the nearest groove, thereby providing the correct shoe clearance.

In Figs. 5–7 the operation is such that the fluid pressure cylinder spreads apart the arcuate levers 138 which in turn applies the rather rigid brake shoes by pressure applied through the U-shaped clip members 140. The shoes are thereafter free to float to anchor at either end. In making an adjustment it will be observed that the plungers 162 adjust both the shoe and arcuate lever simultaneously so that the adjustment is of an extremely simple nature.

In Figs. 8–10 the operation is similar to that of Figs. 1–4 except that the brake shoes when in release position center themselves on the annular groove 238 in the operating cylinder and 70 plunger housing, by reason of the circular notched shoe ends, and in Fig. 11 mechanical operation is provided by the lever and cable control which may spread the shoes independent of the cylinder. By reason of the overrunning slotted end of strut 374, fluid pressure actuation does not disturb the mechanical operation. In Figs. 12–16, inclusive, it will readily be observed that in addition to fluid pressure actuation, the piston may be mechanically operated by suitable connections to the exposed piston rod end.

Thus many important features of improvement will readily appear among which are the provision of a fixed cylinder with a single movable piston with frictionless transmission to a pair of brake shoes, and the simplification of adjustment for wear.

Although several embodiments and modifications of the invention have been illustrated and described, it is to be understood that the invention is not to be limited thereto but may be embodied in other mechanical arrangements and forms. For example, the various features of any one of the modifications might be substituted for those of other modifications. As such and other changes in construction and arrangement may be made without departing from the spirit of the invention as will be apparent to those skilled in the art, reference will be had to the appended claims for a definition of the limits of the invention.

What is claimed is:

1. A brake comprising a backing plate, a drum, a pair of friction shoes adapted to engage said drum, an actuating cylinder and piston between one pair of shoe ends, and an adjusting means between the other, a lever associated with each of said shoes and floatingly fulcrumed adjacent the middle thereof, and adapted to engage the adjusting means at one end, and means for actuating the other ends of said levers from the piston.

2. In a brake having a backing plate, a housing for operating mechanism having a circular operating cylinder perpendicular to said backing plate, having a pair of substantailly axially aligned plunger bores, and having an annular groove in the exterior of said housing cutting through said plunger bores substantially on the axis of said bores, the groove being arranged concentric with said operating cylinder.

3. In a brake having a backing plate, a housing for operating mechanism having a circular operating cylinder perpendicular to said backing plate, having a pair of substantially axially aligned plunger bores, and having an annular groove, lying in a plane parallel to the plate, in the exterior of said housing cutting through said plunger bores, said groove being arranged concentric with said operating cylinder substantially on the axis of said bores.

4. In a brake having a backing plate, a housing for aperating mechanism having a circular operating cylinder perpendicular to said backing plate, having a pair of substantially axially aligned plunger bores, having an annular groove, lying in a plane parallel to the plate, in the exterior of said housing cutting through said plunger bores substantially on the axis of said bores, said groove being arranged concentric to said operating cylinder, plungers in said grooves, and having a pair of brake shoes having an end with a portion adapted to engage the groove and a portion adapted to engage the ends of the plungers.

5. In a brake having a backing plate, a housing for operating mechanism having a circular operating cylinder perpendicular to said backing plate having a pair of substantially axially aligned plunger bores, and having an annular groove, lying in a plane parallel to the plate, in the exterior of said housing cutting through said plunger bores substantially on the axis of said bores, said groove being arranged concentric with said operating cylinder, plungers in said grooves, a pair of brake shoes having an end with a portion adapted to engage the groove and a portion adapted to engage the ends of the plungers, and a hydraulic cylinder having an axis transverse to the backing plate associated with said housing.

6. In a brake, a backing plate, a hydraulic cylinder having a bore and a concentric sleeve, an annular piston between the bore and sleeve, a brake operating member extending through the sleeve and means for transmitting movement of said piston to said member.

7. In a brake, a backing plate, a hydraulic cylinder having a bore and a concentric sleeve, an annular piston between the bore and sleeve, a brake operating member extending through the sleeve, means for transmitting movement of said piston to said member, and means for moving said member independent of said piston.

8. A hydraulic brake operating mechanism, comprising a casing having a cylinder bore, plungers arranged in the bores transverse to said cylinder bore and having adjacent spaced-apart inclined ends, a piston in said cylinder, a pair of rollers in rolling contact with each other and contacting said inclined ends, and means secured to the piston for moving the rollers.

9. A hydraulic brake operating mechanism, comprising means having a cylinder bore and plunger bores transverse thereto, plungers in said plunger bores having adjacent spaced-apart inclined ends, a piston in said cylinder, a pair of rollers in rolling contact with each other and contacting said inclined ends, means operated by the piston for moving the rollers, and resilient means for urging said operating means in one direction.

10. A brake comprising a drum, a hydraulic cylinder, an adjustable anchor, a brake shoe positioned between the cylinder and anchor and adapted to anchor on either end depending on drum rotation, and an arcuate lever closely embracing said shoe provided with a short pivoted link connecting the elever center with the shoe center, said lever engaging said adjustable anchor at one end and fluid pressure operated means associated with said cylinder at the other end.

11. In a hydraulic brake, a backing plate having an aperture, a cylinder casing secured in said aperture, a cylindrical bore in said casing transverse to the plane of the backing plate, a concentric sleeve secured in said casing, an annular piston in the space between said sleeve and bore, an operating member passing through the sleeve, and means for transmitting thrust of said piston to said member.

12. In a hydraulic brake, a backing plate having an aperture, a cylinder casing secured in said aperture, a cylindrical bore in said casing transverse to the plane of the backing plate, a concentric sleeve secured in said casing, an annular piston in the space between said sleeve and bore, an operating member passing through the sleeve, means for transmitting thrust of said piston to said member, a plunger bore in said casing substantially parallel to the plane of the backing plate and passing through the cylinder bore axis, a pair of spaced plungers in said plunger bore, and means carried by said member to transmit thrust simultaneously to both plungers.

13. In a hydraulic brake, a backing plate having an aperture, a cylinder casing secured in said aperture, a cylindrical bore in said casing transverse to the plane of the backing plate, a concentric sleeve secured in said casing, an annular piston in the space between said sleeve and bore, an operating member passing through the sleeve, means for transmitting thrust of said piston to said member, a plunger bore in said casing substantially parallel to the plane of the backing plate and passing through the cylinder bore axis, a pair of spaced plungers having oblique adjacent ends in said plunger bore, and roller means carried by said member to transmit thrust simultaneously to both plungers by wedging action against the oblique ends.

14. A brake comprising a backing plate, a drum, a pair of brake shoes, an adjuster between one pair of adjacent shoe ends, operating means between the other pair of shoe ends including a hydraulic cylinder having an axis transverse to the backing plate, a lever pivoted on one of the shoes adjacent the operating means and a strut from said lever extending to the other shoe at a point adjacent the operating means.

15. A brake comprising a backing plate, a drum, a pair of brake shoes, an adjuster between one pair of adjacent shoe ends, operating means between the other pair of shoe ends including a hydraulic cylinder having an axis transverse to the backing plate, an arcuate lever pivoted on one of the shoes at a point remote from the adjuster shoe end and a strut from said lever extending to the other shoe at a point remote from the other adjuster shoe end.

16. A brake comprising a backing plate, a drum, a hydraulic cylinder mounted on the backing plate perpendicular thereto, a piston therein, a pair of brake shoes, roller wedge means for actuating said shoes from the piston, means for restraining relative movement between said piston and said roller wedge means, means for adjusting the brake for wear, and means associated with an end of each shoe for positioning the shoes in released position.

LUDGER E. LA BRIE.